(12) United States Patent
Luik et al.

(10) Patent No.: US 6,540,287 B2
(45) Date of Patent: Apr. 1, 2003

(54) DETACHABLE FASTENING OF AN INNER LINING, IN PARTICULAR A ROOF LINING, AT A RECEIVING PART OF A MOTOR VEHICLE

(75) Inventors: Klaus Luik, Muehlacker (DE); Olaf Benkler, Neuhausen/Hamberg (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 10/091,495

(22) Filed: Mar. 7, 2002

(65) Prior Publication Data

US 2002/0125742 A1 Sep. 12, 2002

(30) Foreign Application Priority Data

Mar. 9, 2001 (DE) .......................... 101 11 526

(51) Int. Cl.$^7$ .................................................. B60J 7/00
(52) U.S. Cl. ................ 296/214; 296/203.02; 280/730.2
(58) Field of Search ................ 296/214, 210, 296/203.01, 189, 188, 203.02, 39.1; 428/177; 280/730.2, 730.1

(56) References Cited

U.S. PATENT DOCUMENTS

| | | | | |
|---|---|---|---|---|
| 3,195,948 A | * | 7/1965 | Sturtevant et al. | 296/214 |
| 4,070,055 A | * | 1/1978 | Fleisch | 296/214 |
| 4,099,767 A | * | 7/1978 | Kania et al. | 296/214 |
| 4,186,232 A | * | 1/1980 | Cocca et al. | 428/177 |

(List continued on next page.)

FOREIGN PATENT DOCUMENTS

| | | | |
|---|---|---|---|
| DE | 2213820 | | 9/1973 |
| DE | 3820845 | * | 12/1989 |
| DE | 4414905 | | 11/1995 |
| DE | 19729979 | | 10/1998 |
| DE | 198 04 144 | * | 2/1999 |
| DE | 198 44 118 | * | 4/1999 |
| DE | 101 12 746 | * | 10/2001 |
| DE | 100 47 818 | * | 4/2002 |
| EP | 0 088 931 | * | 9/1983 |
| EP | 0090947 | | 10/1983 |
| EP | 0 722 880 | * | 7/1996 |
| EP | 0967136 | | 12/1999 |
| FR | 2698058 | | 5/1994 |
| GB | 2 088 301 | * | 9/1982 |
| GB | 2 095 097 | * | 9/1982 |
| JP | 60166544 | | 8/1985 |
| JP | 62083233 | | 4/1987 |
| JP | 63-240443 | * | 10/1988 |
| JP | 5-85277 | * | 4/1993 |
| JP | 9-254737 | * | 9/1997 |
| JP | 11-28986 | * | 2/1999 |
| JP | 2001-315587 | * | 11/2001 |

OTHER PUBLICATIONS

Copy of Search Report.

*Primary Examiner*—Kiran Patel
(74) *Attorney, Agent, or Firm*—Crowell & Moring LLP

(57) ABSTRACT

Detachable fastening of an inner lining, in particular a roof lining, at a receiving part of a motor vehicle, whereby an edge protection profile, which interacts with a deposited peripheral area of the inner lining, is slipped on a flange of the receiving part and locking hooks for fastening are provided locally on the inner lining. The deposited peripheral area of the inner lining is inserted into a receiving groove of the edge protection profile and the locking hooks of the inner lining interact with the edge protection profile.

6 Claims, 3 Drawing Sheets

U.S. PATENT DOCUMENTS

| | | | | |
|---|---|---|---|---|
| 4,842,328 A | * | 6/1989 | Zweigart et al. | 296/214 |
| 5,265,903 A | * | 11/1993 | Kuretake et al. | 280/730.2 |
| 5,540,478 A | * | 7/1996 | Schuch | 296/210 |
| 5,988,673 A | * | 11/1999 | Stavermann | 280/730.1 |
| 5,988,733 A | * | 11/1999 | Kamo et al. | 296/203.01 |
| 5,988,735 A | * | 11/1999 | Muller | 296/214 |
| 6,173,990 B1 | * | 1/2001 | Nakajima et al. | 296/214 |
| 6,179,324 B1 | * | 1/2001 | White et al. | 280/730.2 |
| 6,199,941 B1 | * | 3/2001 | Takahara et al. | 296/189 |
| 6,227,561 B1 | * | 5/2001 | Jost et al. | 296/214 |
| 6,267,436 B1 | * | 7/2001 | Takahara | 296/203.02 |
| 6,315,350 B1 | * | 11/2001 | Nakane et al. | 296/39.1 |
| 6,367,872 B1 | * | 4/2002 | Bohm et al. | 296/214 |
| 6,435,544 B1 | * | 8/2002 | Brucker | 280/730.2 |
| 2001/0024005 A1 | * | 9/2001 | Takahara | 296/188 |
| 2002/0030387 A1 | * | 3/2002 | Breymaier | 296/214 |

* cited by examiner

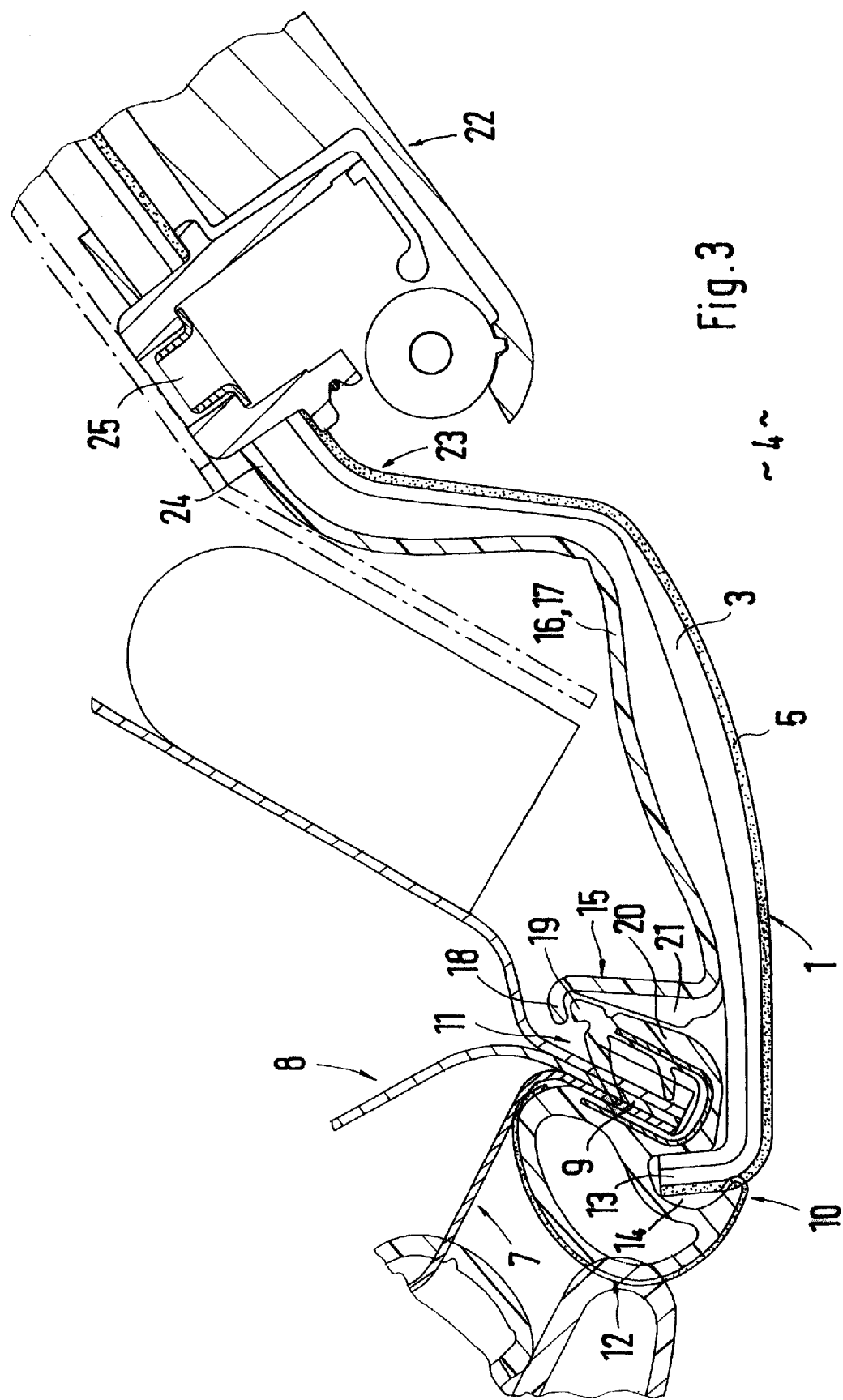

DETACHABLE FASTENING OF AN INNER LINING, IN PARTICULAR A ROOF LINING, AT A RECEIVING PART OF A MOTOR VEHICLE

BACKGROUND AND SUMMARY OF THE INVENTION

This application claims the priority of German Patent Document 101 11 526.1, filed Mar. 9, 2001, the disclosure of which is expressly incorporated by reference herein.

The invention relates to a detachable fastening of an inner lining at a receiving part of a motor vehicle.

Such an inner lining, known from German Patent Document DE 44 14 905 C2, exhibits on the rear side expanded locking hooks, which are inserted during assembly into notches which are impressions of the body-sided receiving part of the motor vehicle. Then an edge protection profile is mounted on a deposited flange of the receiving part, whereby a longitudinally extended lip of the edge protection profile overlaps a peripheral area of the inner lining and rests against the same. This arrangement has the drawback that the design of the body-sided notches at the receiving part constitutes a considerable expense and that owing to the notches the stability of the receiving part is also decreased. Furthermore, to disassemble the inner lining, the edge protection profile must also be removed.

Moreover, owing to the long, deposited lip for the peripheral area of the inner lining the assembled edge protection profile in the passenger compartment exhibits a relatively large width, a feature that is often perceived to be disturbing for stylistic reasons.

The present invention provides an improved fastening for a generic inner lining, which, on the one hand, decreases the cost of production and, on the other hand, improves the image.

The advantages, obtained primarily with the invention, lie in the fact that owing to the fastening of the inner lining at the edge protection profile one can dispense with expensive, body-sided measures and that owing to the insertion of the peripheral area of the inner lining into the receiving groove of the edge protection profile, there is no need for any longitudinally extended lip at the edge protection profile, a feature that improves the visual appearance.

The locking hooks are designed at separate plastic parts, which are fastened locally on the rear side of the inner lining. This fastening operation can be done by cementing or the like. The locking hooks interact with the free end of one leg of a slip-on segment of the edge protection profile so as to reach behind. Preferably the area of the locking hooks exhibits local support ribs, which stabilize the locking hooks.

Other objects, advantages and novel features of the present invention will become apparent from the following detailed description of the invention when considered in conjunction with the accompanying drawings.

One embodiment of the invention is depicted in the drawings and described in detail below.

BRIEF DESCRIPTION OF THE DRAWINGS

FIG. 3 is a sectional view of an inner lining as taken along line 3—3 in FIG. 1 as fastened to a roof of a motor vehicle.

DETAILED DESCRIPTION OF THE DRAWINGS

Figure 1:
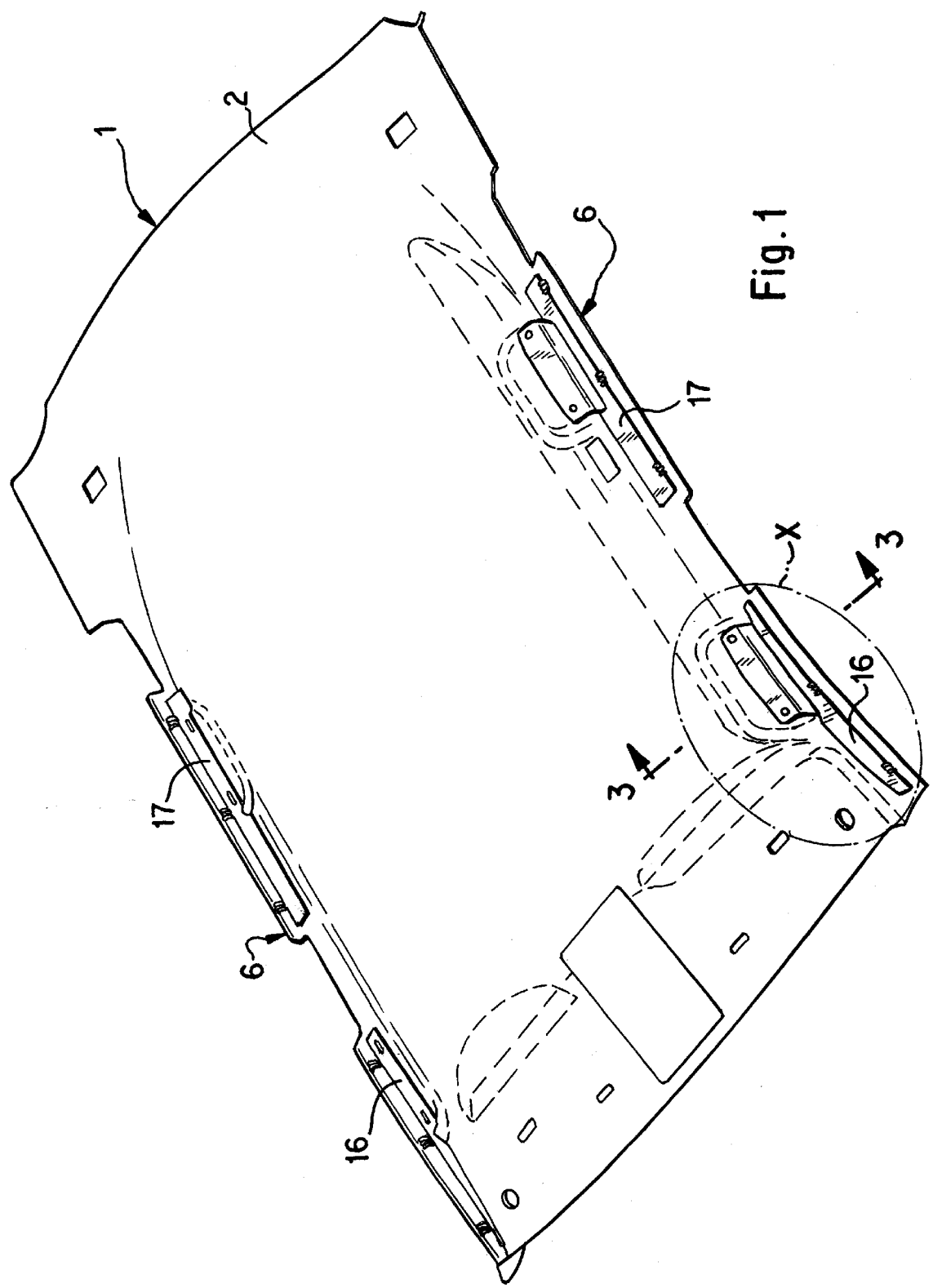
FIG. 1 is a perspective top view of an inner lining of a motor vehicle.
Figure 2:
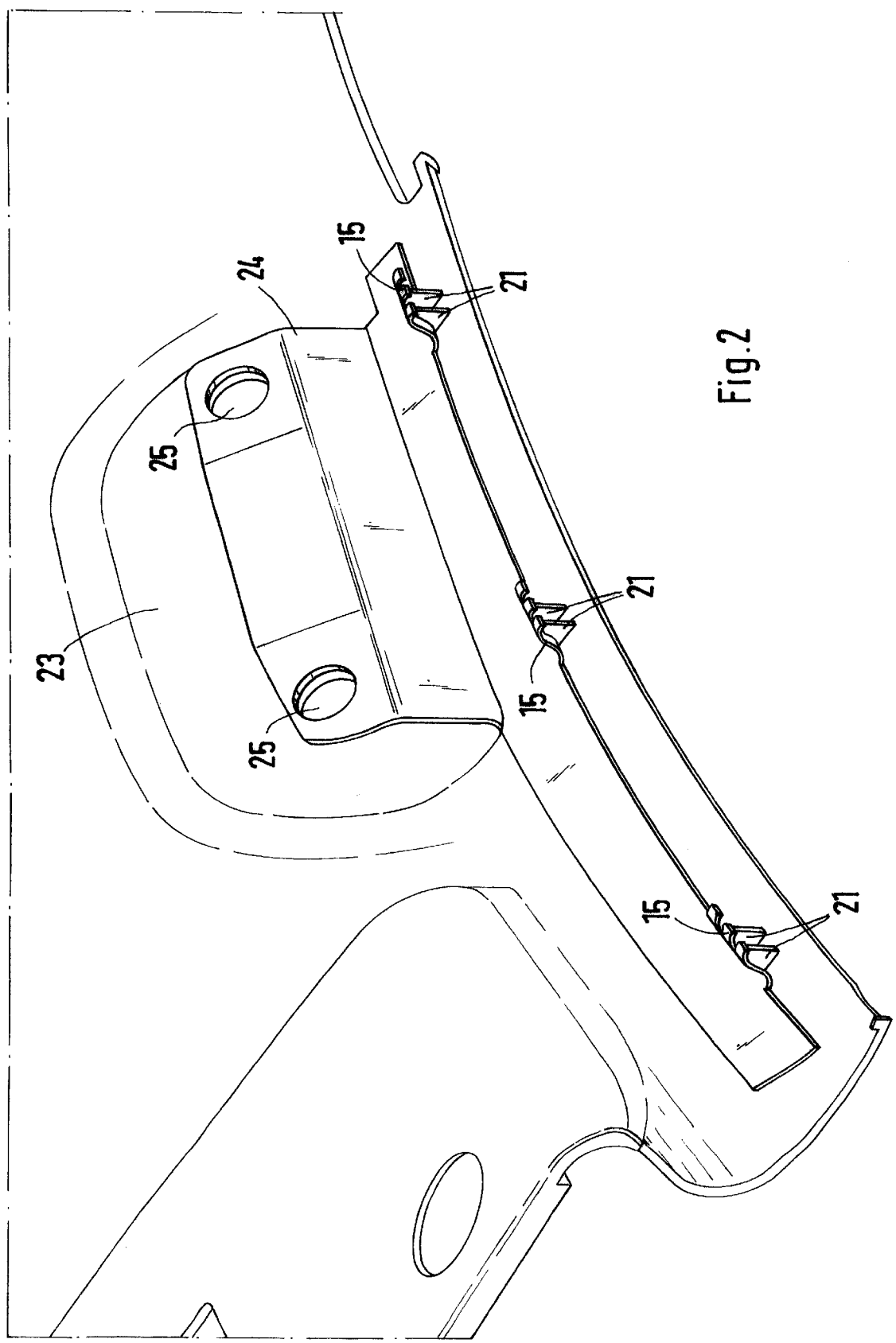
FIG. 2 is an enlarged drawing of a detail X of FIG. 1.

An embodiment for an inner lining 1, as shown in FIGS. 1–3, for a motor vehicle is formed by a roof lining and in particular by a prefabricated, self-supporting roof liner 2. The inner lining 1 comprises at least one plate-shaped support member 3, which is backed with a decorative coating 5 on the side facing a passenger compartment 4.

The large area inner lining 1 is fastened on both longitudinal sides 6 at adjacent body-sided receiving parts 7, where the receiving parts 7 are formed by lateral roof frames 8 of the motor vehicle.

To fasten detachably the inner lining 1, an edge protection profile 10, which comprises a slip-on segment 11, whose profile is somewhat U shaped, and a tubular profile 12, which is disposed on the side of the slip-on segment, is mounted on a deposited flange 9 of the receiving part 7.

According to the invention, a peripheral area 13, which belongs to the inner lining 1 and is deposited in the upward direction, is inserted into a receiving groove 14 of the edge protection profile 10, whereby the receiving groove 14, which is open in the direction of the passenger compartment 4, is provided in the transition area between the slip-on segment 11 and the tubular profile 12.

Furthermore, to fasten the inner lining 1, there are locally the locking hooks 15 on the inner lining and in particular on the side facing away from the passenger compartment 4. The locking hooks interact with the edge protection profile 10 so as to reach behind.

The locking hooks 15 are designed, in the illustrated embodiment, on longitudinally extended plastic parts 16, 17, which are connected stationarily by cementing or the like to the rear side of the inner lining 1.

As shown in FIG. 1, two longitudinally extended plastic parts 16, 17, which are spaced apart, are disposed on both longitudinal sides 6 of the inner lining 1. As shown in FIG. 2, the locking hooks 15, which project upward, are molded locally to the plastic parts 16, 17. The locking hooks 15 are at a distance from the outer peripheral area 13 of the inner lining 1 and can be protected locally along their longitudinal stretch.

When the inner lining is assembled, a one-sided bent hook segment 18 of each locking hook 15 reaches behind a free end 19 of the inside leg 20 of the slip-on segment 11 of the edge protection profile 10.

The locking hooks 15 exhibit locally support ribs 21, which rest against the outside of the leg 20 of the slip-on segment 11. During assembly of the inner lining, the lining is moved upward and the peripheral area 13 is inserted into the receiving groove 14 of the edge protection profile 10, which is already slipped on. As the inner lining 1 is pushed upward, the locking hooks 15 interlock with the edge protection profile 10, thus fastening the inner lining 1. The inner lining 1 can also be fastened by handles 22. In the area of the handles 22 the inner lining is provided with an impression 23. Each plastic part 16, 17 exhibits locally a rectangular molded-on member 24 with openings 25 to insert fastening screws for the handle 22.

The receiving groove 14, adjacent to the tubular profile 12 and the slip-on segment 11, results in a very narrow edge protection profile 10 exhibiting a design without piping (without sealing lip), a feature that is regarded as advantageous for visual reasons.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A detachable fastener of an inner lining at a receiving part of a motor vehicle, wherein an edge protection profile is slipped on a flange of the receiving part, comprising: locking hooks for fastening provided on the inner lining, and a peripheral area of the inner lining, wherein the peripheral area is inserted into a receiving groove of the edge protection profile and wherein the locking hooks of the inner lining interact with the edge protection profile so as to reach behind the edge protection profile toward a roof of the vehicle.

2. Detachable fastener of an inner lining, as claimed in claim 1, wherein the locking hooks are provided at plastic parts attached on a side of the inner lining opposite a passenger compartment.

3. Detachable fastener of an inner lining, as claimed in claim 2, wherein the plastic parts are cemented to the inner lining.

4. Detachable fastener of an inner lining, as claimed in claim 1, wherein the locking hooks interact with a free end of a leg of a slip-on segment of the edge protection profile so as to reach behind the leg.

5. Detachable fastener of an inner lining, as claimed in claim 4, wherein support ribs, which rest against an outside of the leg of the slip-on segment of the edge protection profile, are molded to the locking hooks.

6. Detachable fastener of an inner lining, as claimed in claim 2, wherein the inner lining in the area of the plastic parts is also held in position at the receiving part by handles.

* * * * *